(12) United States Patent
Haefliger et al.

(10) Patent No.: US 7,516,358 B2
(45) Date of Patent: Apr. 7, 2009

(54) TUNING CORE VOLTAGES OF PROCESSORS

(75) Inventors: Juerg Haefliger, Cupertino, CA (US); William F. Bruckert, Cupertino, CA (US); James S. Klecka, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 11/312,201

(22) Filed: Dec. 20, 2005

(65) Prior Publication Data

US 2007/0174746 A1 Jul. 26, 2007

(51) Int. Cl.
*G06F 11/00* (2006.01)

(52) U.S. Cl. .............................. 714/10; 714/11; 714/47; 700/2; 700/186

(58) Field of Classification Search .................. None
See application file for complete search history.

(56) References Cited

U.S. PATENT DOCUMENTS

| | | | |
|---|---|---|---|
| 5,634,001 A * | 5/1997 | Mittl et al. ..................... 714/33 |
| 6,393,582 B1 | 5/2002 | Klecka |
| 6,615,373 B2 | 9/2003 | Elko et al. |
| 6,628,583 B1 | 9/2003 | Van Den Enden |
| 6,804,632 B2 * | 10/2004 | Orenstien et al. ........... 702/188 |
| 7,287,205 B2 * | 10/2007 | Lin et al. ..................... 714/738 |
| 7,296,181 B2 * | 11/2007 | Safford et al. ................. 714/11 |
| 2003/0149909 A1 | 8/2003 | Elko et al. |
| 2003/0149920 A1 | 8/2003 | Elko et al. |
| 2003/0196025 A1 | 10/2003 | Dahlen et al. |
| 2004/0059545 A1 * | 3/2004 | Sun .............................. 702/186 |
| 2004/0181730 A1 * | 9/2004 | Monfared et al. ............ 714/745 |
| 2005/0114735 A1 | 5/2005 | Smith |
| 2005/0132238 A1 * | 6/2005 | Nanja .......................... 713/300 |
| 2005/0240811 A1 | 10/2005 | Safford |
| 2005/0246581 A1 | 11/2005 | Jardine et al. |
| 2006/0047794 A1 * | 3/2006 | Jezierski ...................... 709/221 |

FOREIGN PATENT DOCUMENTS

JP 2001034502 A * 2/2001

OTHER PUBLICATIONS

Austin et al. "Making Typical Silicon Matter with Razor". IEEE Mar. 2004.*
Oliveri et al. "A Low-Power Microcontroller with On-Chip Self-Tuning Digital Clock . . . " 1999.*
Ernst et al. "Razor: A Low-Power Pipeline Based on Circuit-Level Timing Speculation" 2003.*
Austin, "Making Typical Silicon Matter with Razor", Mar. 2004.
Olivieri, "A Low-Power Microcontroller with On-Chip Self-Tuning Digital Clock . . . ", 1999.
Ernst, "Razor: A Low-Power Pipeline Based on Circuit-Level Timing Speculation", 2003.
Bruckert; 'Method and System of Executing Duplicate Copies of a Program in a Lock Step', Pending U.S. Appl. No. 60/675,810, filed Apr. 28, 2005.

* cited by examiner

*Primary Examiner*—Yolanda L Wilson

(57) ABSTRACT

A method, apparatus, and system are disclosed for tuning core voltages of processors. One embodiment is a method for software execution. The method includes varying core voltages of plural processors operating in lockstep to determine an operating range for each of the plural processors, and adjusting the core voltages of the plural processors within the operating range to tune the plural processors.

22 Claims, 2 Drawing Sheets

TUNING CORE VOLTAGES OF PROCESSORS

BACKGROUND

Some computer systems require high reliability to ensure data integrity and continuous computation, even during a fault or failure. Computer systems involved in banking, telecommunications, stock markets, and other mission critical activities must be reliable. To achieve this reliability, computer systems utilize multiple processors to achieve fault-tolerant computing.

Fault-tolerant computing systems have the ability to tolerate a failure of a component and continue to operate. Some fault-tolerant computing systems use redundant circuit paths so that a failure of one path does not halt operation of the system. Other systems use self-checking circuitry having identical processor units. Each processing unit receives the same inputs to produce the same outputs. These outputs are compared, and if an inconsistency occurs, then both processing modules are halted in order to prevent a spread of possible corrupt data. In some instances, two or more processing units operate in a lockstep mode in which each processor performs the same task at the same time.

Even fault-tolerant computing systems encounter failures and shutdowns. In some self-checking systems, for instance, soft errors (example, a cache error seen by one of the paired processors but not the other) require both processors to be halted and restarted. Other errors also cause failure. For example, processor designs using translation look-a-side buffers with entry checking, parity checking, bus protocol checking, and the like can have one processor detecting an error while the other processor does not.

Failures in fault-tolerant or self-checked processing systems occur for other reasons as well. Processors operate at core voltages that are set by the manufacturer. In multiple processor systems, however, these processors have minor nondeterministic behavior at the core voltages specified by the manufacturer. Even though this nondeterministic behavior does not effect normal processor operations, a pair of self-checked processor operating in lockstep will exhibit system failures. These failures are due to variations in the processors performing requests, responses, and order of appearances on the system interfaces.

DETAILED DESCRIPTION

Exemplary embodiments in accordance with the present invention are directed to systems, methods, and apparatus for tuning core voltages of processors. In one exemplary embodiment, a method sweeps core voltages of plural microprocessors operating in lock-step against each other until system failure or anomalies are detected. This operation dynamically determines a working range of the microprocessors under full or heavy system load. The core voltages are then adjusted so the microprocessors reliably operate in lock-step. By adjusting the core voltages of individual microprocessors, operating points are discovered at which the microprocessors deterministically operate. Failures and anomalies are reduced for the plural microprocessors.

Figure 1:
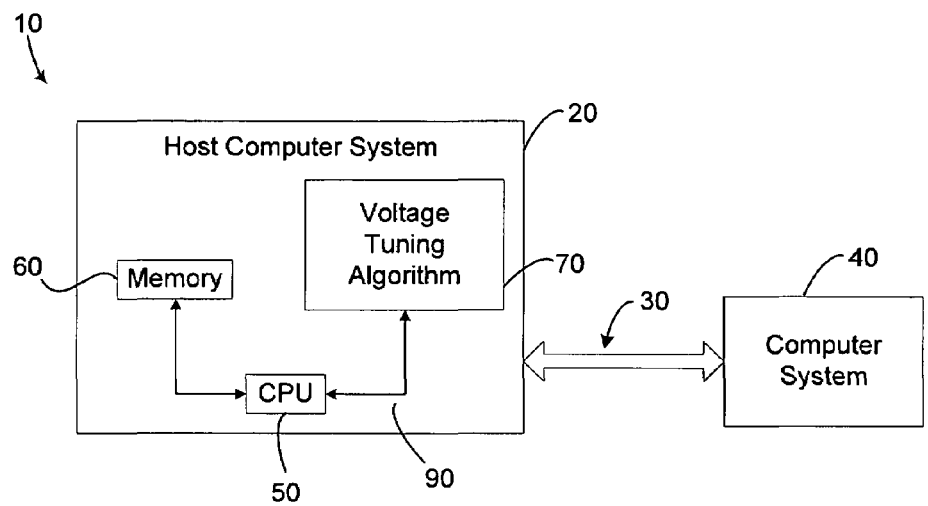
FIG. 1 illustrates an exemplary system in accordance with an embodiment of the present invention.

Embodiments in accordance with the invention are utilized with various systems, methods, and apparatus. FIG. 1 illustrates an exemplary embodiment as a system 10 for tuning core voltages of plural processors. The system 10 generally includes a host computer system 20 connected at 30 to a computer system 40 having plural processors that are tuned in accordance with the present invention.

The host computer system 20 comprises a processing unit 50 (such as one or more processors or central processing units, CPUs) for controlling the overall operation of memory 60 (such as random access memory (RAM) for temporary data storage and read only memory (ROM) for permanent data storage) and a voltage tuning algorithm 70. The memory 60, for example, stores data, control programs, and other data associate with the host computer system 20. In some embodiments, the memory 60 stores the voltage tuning algorithm 70. The processing unit 50 communicates with memory 60, voltage tuning algorithm 70, and many other components via buses 90.

Embodiments in accordance with the present invention are not limited to any particular type or number of computer systems. The host computer system 20 and computer system 40, for example, include various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

The host computer system 20 connects at 30 to the computer system 40. This connection 30 includes, for example, a wireline connection and/or a wireless connection. Wireline connections are those that use physical media such as cables and telephone lines, whereas wireless connections use media such as satellite links, radio frequency waves, and infrared waves, for example. Many connection techniques can be used with these various media, such as using modems, cable connections, telephone lines, digital subscriber lines (DSL), satellite, local-area networks (LAN) cards, and cellular modems, just to name a few examples. Further, the connection 30 includes various networks, such as the internet, intranets, digital telephony networks, digital television networks, or digital cable networks, to name a few examples.

Figure 2:
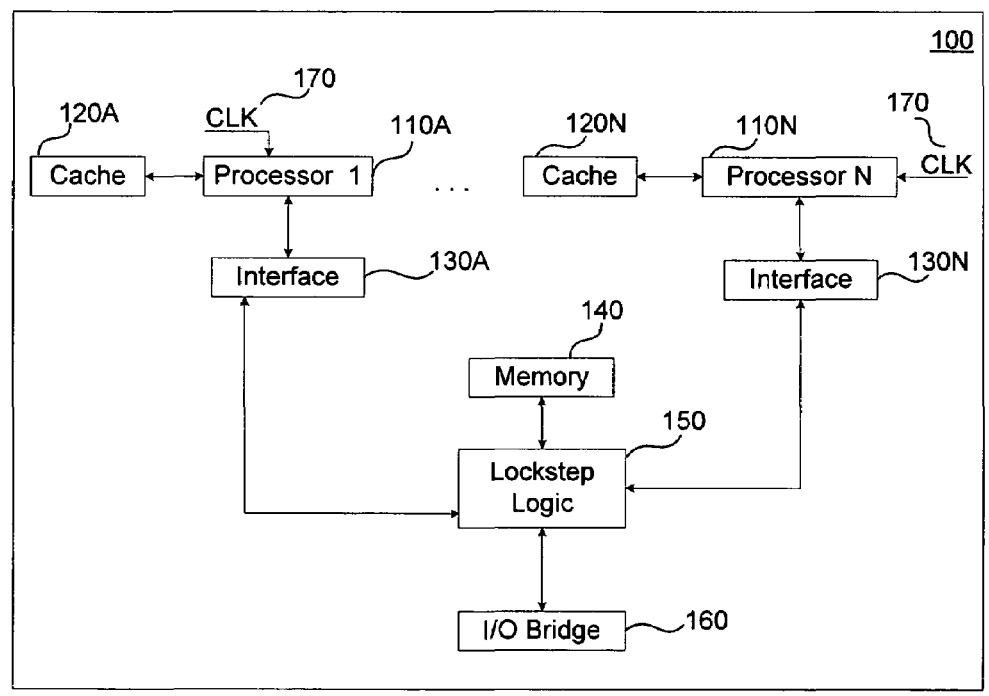
FIG. 2 illustrates an exemplary block diagram of a logical processor formed of plural interconnected processing units in accordance with an embodiment of the present invention.

FIG. 2 illustrates a block diagram of a logical processor 100 formed of two or more interconnected processors, processor cores, or processing units 110A and 110N (representing a first processor A to an $N^{th}$ processor). In one exemplary embodiment, the logical processor 100 forms a part of a larger data processing or computer system (such as computer system 40 shown in FIG. 1). Further, the processing units can be configured in a wide variety of embodiments, such as but not limited to separate processors (example, single core processors) or multi-core processor units (example, each processor independently operates but shares certain resources).

In one exemplary embodiment, processor 110A is a master processor unit, and processor 110N is a redundant or shadow processor unit. Both processor units include various cache memory structures 120A, 120N that may be internal and/or external to the processor or microprocessor forming the processor unit.

The processor unit 110A is coupled, via an interface 130A, to lockstep logic 150 and an input/output (I/O) bridge 160. The processor unit 110N is coupled, via an interface 130N, to the lockstep logic 150 and the I/O bridge 160. The I/O bridge 160 connects the logical processor 100 to I/O links that provide an input/output gateway between the logical processor 100 and the remainder of the data or computer processing system (such as computer system 40 of FIG. 1).

FIG. 2 shows one exemplary embodiment of how the logical processor 100 communicates to a larger system. For example, the I/O bridge 160 and associated I/O links are a pair of interface elements: one for inter-processor communication in a multiple processor system, and another for input/output communication between the logical processor 100 and various peripheral units. Alternatively, the I/O bridge 160 and I/O links are a single interface to a communication network that provides communication between the logical processor 100 and other processor units and peripheral devices in a multiple processing environment. Those skilled in the art will recognize that other communication interface structures are also used to implement the I/O bridge 160.

In one exemplary embodiment, the lockstep logic 150 includes memory, a processor, a controller, and self-check logic. Incoming I/O data is transmitted from the I/O bridge 160 to the lockstep logic 150. The I/O data is then transmitted from the lockstep logic 150 to memory 140 for storage and to interfaces 130A and 130N and processor units 110A and 110N (example, for cache updates, etc.). Outgoing I/O data from the interface 130A is transmitted through the lockstep logic 150 and to the I/O bridge 160. The shadow processor unit 110N also writes the same outgoing I/O data. The shadow output I/O data is conveyed by the interface 130N to the lockstep logic 150 where the data is checked against the outgoing I/O data produced by the processor unit 110A.

When the processor unit 110A requests a memory read operation (via the interface 130A) the data from the memory 140 is "reflected" to the interface 130N in response to the identical request. In other words, the data from memory 140 is coupled to the lockstep logic 150 which then couples two identical copies of the data to the interfaces 130A and 130N in response to the identical request. Although both processor units perform write operations, the processor unit 110A actually writes data to memory. The data "written" by the shadow processor unit 110N (together with the address and control signals) is conveyed, by the interface 130N, to the lockstep logic 150. The lockstep logic 150 compares the data from the processor 110N to that written to memory 140 by the processor unit 110A. The lockstep logic 150 determines or identifies an inconsistency or mismatch between any of the data, address, or control signals of the processor units.

In one exemplary embodiment, the processor units 110A and 110N operate in lockstep or synchronization to execute identical instruction streams, instruction by instruction, based on a same clock signal 170. As used herein, the term "lockstep" means two or more processors execute substantially identical copies of instructions (operating system and application programs) substantially simultaneously in cycle-by-cycle synchronization.

The lockstep processor technique achieves high reliability in a processor system by adding a second identical processor (the shadow or checker processor) to monitor and verify the operation of the system processor. The two processors are initialized to the same state during system start-up and then receive identical inputs. Thus, the two processors operate in lockstep. Generally, an error in one of the processors causes a difference between the states of the two processors. This difference is manifested by different outputs (example, address signals, data signals, and control signals) and detected by the lockstep logic 150.

Figure 3:
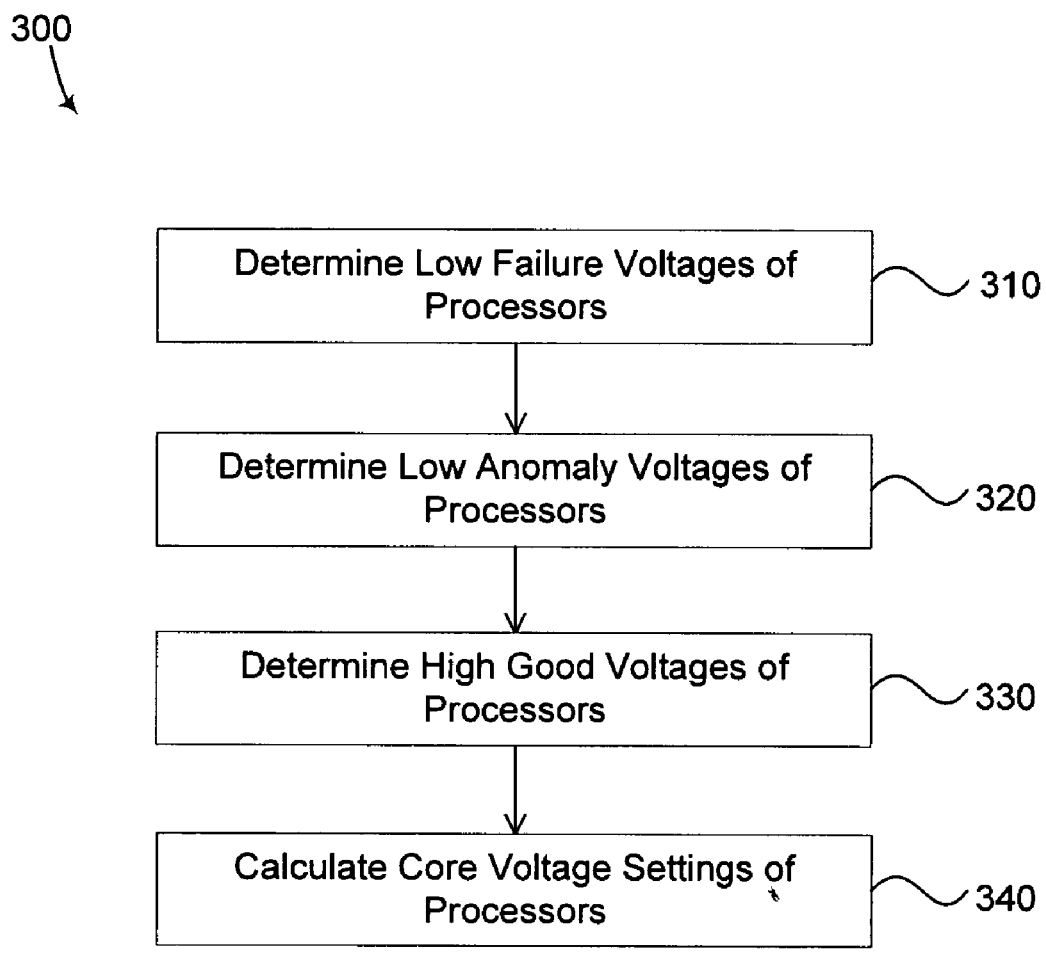
FIG. 3 illustrates an exemplary flow diagram for tuning core voltages of processors in accordance with an embodiment of the present invention.

FIG. 3 illustrates an exemplary flow diagram 300 for tuning core voltages of plural self-checked processors or processors operating in lockstep. In one exemplary embodiment, the flow diagram 300 is implemented as voltage tuning algorithm 70 of FIG. 1.

One exemplary method sweeps the core voltages of plural processors operating in cycle-by-cycle lockstep. The core voltage (specified by the vendor or manufacturer) is the specific voltage that the processor uses to execute properly. In some embodiments, a voltage regulator converts supplied power to the correct core voltage for processors in a socket or slot.

During the tuning process, optimal operating core voltage settings are determined for the processors, and the core voltages of the processors are adjusted to these optimal settings. The optimal operating point, for instance, is the core voltage at which a processor does not exhibit non-deterministic behavior. Since non-deterministic behavior is dependent on the stress that is applied to a system and the processors, stress or heavy load conditions are imparted to the processors while tuning the core voltages.

In one exemplary embodiment, the processors are operated according to a test case or load scenario that includes a program to be executed by the processors. For instance, the test case is a memory image or one or more computer executable instructions, along with an indication of the starting point and other state data (such as initial register content, external interrupt state, etc.). The test case defines an initial state for the processors that are being simulated and the environment in which they operate. In exemplary embodiments, the test case is stored as an external agent or in the host computer system 20 of FIG. 1.

In one exemplary embodiment, the lockstep logic 150 of FIG. 2 monitors outputs of the processors to identify when divergences (such as errors, anomalies, or failures) occur. By way of example, the processors units can detect some errors, such as self-detecting errors. When a failing processor experiences the error, the lockstep logic receives an error message from the failing processor. In other instances, the processors do no detect an error, but the lockstep logic detects different data being output from the processors that are operating in lockstep. In normal lockstep operation, the output of the processors is identical such that the processor units behave deterministically.

For purposes of discussion, two processors are discussed in connection with the flow diagram 300, but the discussion is equally applicable to more than two processors. The processors are designated as processor A and processor B. These processors, for example, can correspond to processor units 110A and 110N discussed in connection with FIG. 2.

According to block 310, a determination is made of the low failure or freeze voltages of the processors. The algorithm first sets the core voltages of both processors A and B to nominal values (such as nominal values specified by manufacturer of the processors). The core voltages of the processors A and B are moved downwardly in increments to generate a failure. By way of example, the core voltage of processor A is repeatedly moved down in increments (example, 10 millivolt increments) using predetermined dwell times (example, 5 second dwell times). The core voltage of processor A is repeatedly lowered until an error or system failure occurs and is detected. In one exemplary embodiment, a system failure occurs when the requests and responses from the two processors A and B are overly divergent, non-matching, non-synchronous, or too divergent according to parameters of an external agent (example, a separate processor that checks discrepancies between the response of the processors). Processors operating in lockstep become divergent when they exhibit different outputs (example, loosing cycles or gaining cycles such that the processor responses do not match). The voltage at which a computer system stops functioning is stored in memory as a low failure or freeze voltage of processor A. The core voltage of processor A is then reset to the nominal value, and the system and stress tests are reloaded.

Once the failure voltage of processor A is determined, the failure voltage of processor B is determined. By way of example, the core voltage of processor B is repeatedly moved down in increments (example, 10 millivolt increments) using predetermined dwell times (example, 5 second dwell times). The core voltage of processor B is repeatedly lowered until an error or system failure occurs and is detected. In one exemplary embodiment, a system failure occurs when the requests and responses from the two processors A and B are overly divergent or too divergent for an external agent. Thus, the voltage at which a computer system stops functioning is stored in memory as a low failure or freeze voltage of processor B. The core voltage of processor B is then reset to the nominal value, and the system and stress tests are reloaded.

According to block 320, a determination is made of low anomaly or slip voltages of the processors. The algorithm sets the core voltages of both processors A and B to a predetermined level above the low failure voltages previously discovered in connection with block 310. The core voltages of the processors A and B are then moved downwardly in increments. By way of example, the core voltage of processor A is repeatedly moved down in increments (example, 10 millivolts) using predetermined dwell times (example, 1 minute dwell times) longer than previously used in connection with block 310. The core voltage of processor A is repeatedly lowered until a system anomaly occurs and is detected. In one exemplary embodiment, a system anomaly occurs when divergences in the requests and responses from the two processors A and B are minor, not overly divergent, or able to be resolved by the external agent. As used herein, the term "anomaly" means a divergence, deviation, or abnormality that is less than a failure. The voltage at which a computer system determines an anomaly is stored in memory as a low anomaly or slip voltage of processor A.

Once the low anomaly voltage of processor A is determined, the low anomaly voltage of processor B is determined. The algorithm sets the core voltages of both processors A and B to the predetermined level above the low failure voltages previously discovered. As performed with processor A, the core voltage of the processor B is moved downwardly in increments. By way of example, the core voltage of processor B is repeatedly moved down in increments (example, 10 millivolts) using predetermined dwell times (example, 1 minute dwell times) longer than previously used in connection with block 310. The core voltage of processor B is repeatedly lowered until a system anomaly occurs and is detected. In one exemplary embodiment, a system anomaly occurs when divergences in the requests and responses from the two processors A and B are minor, not overly divergent, or able to be resolved by the external agent. The voltage at which a computer system determines an anomaly is stored in memory as a low anomaly or slip voltage of processor B.

In one exemplary embodiment, the increments used according to block 320 are smaller than or equal to the increments used according to block 310. Thus, reductions according to block 310 are implemented using a coarse and fast tuning (i.e., larger increments and shorter dwell times) to discover the low freeze voltages. By contrast, the reductions according to block 320 are implemented for fine-tuning and use smaller increments and longer dwell times.

Next, according to block 330, a determination is made of high good or acceptable voltages of the processors. The algorithm first sets the core voltages of both processors A and B to a predetermined level above the low anomaly voltages determined in connection with block 320. By way of example, the core voltages of processors A and B are set to 100 millivolts above the low anomaly voltages. Next, the core voltage of processor A is moved or raised above the vendor specified maximum setting but still low enough not to damage the processor. From this core voltage level, the core voltage of processor is moved down or lowered in predetermined increments (example, 10 millivolts) until no system anomalies or system failures are detected within a predetermined time (example, 15 minutes). In order to expedite the tuning process, the voltage is changed as soon as system anomalies or system failures are detected. At this juncture, the predetermined time (example, 15 minute increments) is reset. The voltage at which the system begins normal operation is stored as the high good voltage of processor A. In one exemplary embodiment, the normal operation of the system is based on a time increment. For example, if no system anomalies or failures occur within 15 minutes, then the system is normally operating. Once the high good voltage or processor A is determined, the voltage of processor A is reset back to the level (example, 100 millivolts) above its low anomaly voltage.

Once the high good voltage of processor A is determined, the high good voltage of processor B is determined. The algorithm sets the core voltages of both processors A and B to the predetermined level above the low anomaly voltages used in connection with processor A. Next, the core voltage of processor B is moved or raised above the vendor specified maximum setting but still low enough not to damage the processor. From this core voltage level, the core voltage of processor B is moved down or lowered in predetermined increments (example, 10 millivolts) until no system anomalies or system failures are detected within a predetermined time (example, 15 minutes). In order to expedite the tuning process, the voltage is changed as soon as system anomalies or system failures are detected. At this juncture, the predetermined time (example, 15 minute increments) is reset. The voltage at which the system begins normal operation is stored as the high good voltage of processor B.

The high good voltages of the processors can be determined using other methods as well. For example, first set both processors to a predetermined increment (example, 100 millivolts) above their low anomaly voltages. Next increment the voltage of processor A until anomalies occur (this value is the high good voltage of processor A). Next, set processor A back to the predetermined increment (example, 100 millivolts) above its low anomaly voltage and then increment the voltage of processor B until anomalies are detected (this value is the high good voltage of processor B).

As noted in connection with processor A, the normal operation of the system is based on a time increment. For example, if no system anomalies or failures occur within 15 minutes, then the system is normally operating. Once the high good voltage or processor B is determined, the voltage of processor B is reset back to the level (example, 100 millivolts) above its low anomaly voltage.

According to block 340, the optimal core voltage settings for processors A and B are calculated. With the determinations from blocks 310-330, the operating range of both processors for the given system load is now known to be between the individual low anomaly voltages and the individual high good voltages. In other words, an operating range has been determined for the processors while they are operating in a heavily loaded condition. In this operating range, anomalies and failures do not occur.

The operating range data is then used to calculate the final or optimal core voltage settings and to determine if the given processors are acceptable for system operations. In one exemplary embodiment, a processor is acceptable for system operations if it has a large enough or wide enough operating range. A determination is thus made as to whether the processor has a large enough operating range under heavy load such that no anomalies or failures occur. By way of example, a processor has an acceptable operating range if this operating range is at least 200 millivolts wide or some other predetermined range. Further, in one exemplary embodiment, the final core voltage setting is set to a predetermined increment with respect to the operating range. For example, the core voltage is set to a mid-point of the operating range, a predetermined increment above the low anomaly voltage, or a predetermined increment below the high good voltage. By way of example, if the processor has an operating range of 200 millivolts, then the processor is set to have a core voltage of 100 millivolts (i.e., in the middle of the operating range, between the low anomaly voltage and the high good voltage).

In one exemplary embodiment, the tuning process is expedited by altering the process of block 330. For instance, the core voltages of processors A and B are set to a predetermined level above their respective anomaly voltages. If the system does not exhibit any system anomalies or failures for a predetermined amount of time, the current voltage settings are stored as the high good voltages of processors A and B. By way of example, if a 200 millivolt operating range is desired, then the core voltages of the processors are set to 200 millivolts above the low anomaly voltages. If the system does not exhibit an anomaly or failure at this voltage during a predetermined amount of time, then the voltage (i.e., 200 millivolts plus the low anomaly voltage) is established as the high good voltage. Thus, instead of finding the individual high good voltages of the two processors, this alternate embodiment verifies that both processors exhibit a working range within a predetermined threshold (example, a working range of 200 millivolts).

The different numbers for voltages, levels, time periods, etc. are exemplary and merely provided for discussion. These numbers will differ for various types of processors, operating environments, system loads, etc. Further, these numbers are programmable via a parameter file that is supplied to the algorithm during runtime.

Tuning voltages for individual processors maximizes the stability and performance of the computer system with respect to the occurrence of system anomalies or system failures. Additionally, formally unusable processors (example, processors that would not deterministically work at a vendor specified core voltage) can be used, and the overall yield or performance of the processor increased.

Embodiments in accordance with the invention are not limited to processors executing in strict lockstep. In some exemplary embodiments, the processors execute substantially equivalent instructions in a loosely synchronized or loosely-stepped manner. For instance, each processor includes its own clock and runs asynchronously with respect to the other clock source. Further, in some embodiments, the processors run in a non-deterministic or loose lockstep operation (i.e., the processors are not running in strict lockstep) or exhibit cycle slips, out-of-order operations, etc.

In one exemplary embodiment, the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, specific numerical data values (such as specific quantities, numbers, labels, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software (whether on the host computer system of FIG. 1, a client computer, or elsewhere) will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive; CD-ROM, ROM, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein. Further, various calculations or determinations (such as those discussed in connection with the figures are displayed, for example, on a display) for viewing by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for tuning plural processors, comprising:
varying core voltages of plural processors operating in lockstep to determine an operating range for each of the plural processors;
adjusting the core voltages of the plural processors within the operating range to tune the plural processors; and
adjusting the core voltages of the plural processors to increase performance of the plural processors while the plural processors operate in cycle-by-cycle lockstep, wherein the core voltages of the plural processors are raised and lowered at predetermined increments and held at voltages for predetermined dwell times to determine if an anomaly occurs.

2. The method of claim 1 further comprising:
determining a first voltage value where the plural processors exhibit anomalies while executing instructions; and
determining a second voltage value where the plural processors exhibit failures while executing instructions.

3. The method of claim 1 further comprising:
determining low-end and high-end voltages where the plural processors exhibit anomalies; and
using the low-end and high-end voltages to calculate the operating range.

4. The method of claim 1 further comprising, adjusting the core voltages of the plural processors to be in a middle of the operating range.

5. The method of claim 1 further comprising, operating the plural processors under full load to determine the operating range.

6. The method of claim 1 further comprising, raising and lowering the core voltages of the plural processors to determine voltages where failures occur in order to calculate the operating range.

7. A computer storage medium having software programming code-for causing a computer to execute a method, comprising:
lowering a core voltage of one of two processors executing instructions in synchronization to determine a first voltage value;
raising the core voltage of the one processor to determine a second voltage value; and
using the first and second voltage values to tune the core voltage of the one processor to increase performance of the two processors, wherein the first and second voltage values are voltages where anomalies occur while the two processors are executing instructions in lockstep.

8. The computer storage medium of claim 7 further comprising:
lowering the core voltage of the one processor until a first failure occurs; and
raising the core voltage of the one processors until a second failure occurs.

9. The computer storage medium of claim 7 further comprising, repeatedly lowering and raising the core voltage of the one processor in increments to determine voltage levels for anomalies.

10. The computer storage medium of claim 7 further comprising:
determining a lowest voltage where anomalies occur for each of the two processors;
determining a highest voltage where anomalies occur for each of the two processors; and
changing the core voltages of the two processors to have a voltage between the lowest and highest voltages.

11. A computer system, comprising:
memory for storing an algorithm; and
a processor for executing the algorithm which when executed causes the processor to:
raise and lower core voltages of plural processors operating in lockstep to determine an operating range having no anomalies for each of the plural processors;
change the core voltages of the plural processors within the operating range to tune the plural processors; and
determine where the plural processors exhibit failures while executing instructions under full load.

12. The computer system of claim 11, wherein the processor further executes the algorithm to:
find a voltage where one of the plural processors first exhibits an anomaly; and
find a voltage where the one of the plural processors first exhibits a failure.

13. The computer system of claim 11, wherein the core voltages of the plural processors are tuned to decrease an occurrence of failures while the plural processors are operating in cycle-by-cycle lockstep.

14. The computer system of claim 11, wherein the computer system is a server computer.

15. A computer system, comprising:
memory for storing an algorithm; and
a processor for executing the algorithm which when executed causes the processor to:
raise and lower core voltages of plural processors operating in lockstep to determine an operating range having no anomalies for each of the plural processors; and
change the core voltages of the plural processors within the operating range to tune the plural processors, wherein the operating range has a lowest voltage value where anomalies first occur and a highest voltage value where anomalies first occur.

16. The computer system of claim 15, wherein the processor further executes the algorithm to:
find a voltage where one of the plural processors first exhibits an anomaly; and
find a voltage where the one of the plural processors first exhibits a failure.

17. The computer system of claim 15, wherein the core voltages of the plural processors are tuned to decrease an occurrence of failures while the plural processors are operating in cycle-by-cycle lockstep.

18. The computer system of claim 15, wherein the computer system is a server computer.

19. A computer system, comprising:
memory for storing an algorithm; and
a processor for executing the algorithm which when executed causes the processor to:
raise and lower core voltages of plural processors operating in lockstep to determine an operating range having no anomalies for each of the plural processors; and
change the core voltages of the plural processors within the operating range to tune the plural processors, wherein the core voltages of the plural processors are raised and lowered at predetermined increments and held at voltages for predetermined dwell times to determine if an anomaly occurs.

20. The computer system of claim 19, wherein the processor further executes the algorithm to:
find a voltage where one of the plural processors first exhibits an anomaly; and
find a voltage where the one of the plural processors first exhibits a failure.

21. The computer system of claim 19, wherein the core voltages of the plural processors are tuned to decrease an occurrence of failures while the plural processors are operating in cycle-by-cycle lockstep.

22. The computer system of claim 19, wherein the computer system is a server computer.

* * * * *